July 5, 1938. W. LEATHERS 2,122,799
SHAKER FOR VACUUM CLEANER FILTERS
Filed Feb. 24, 1936
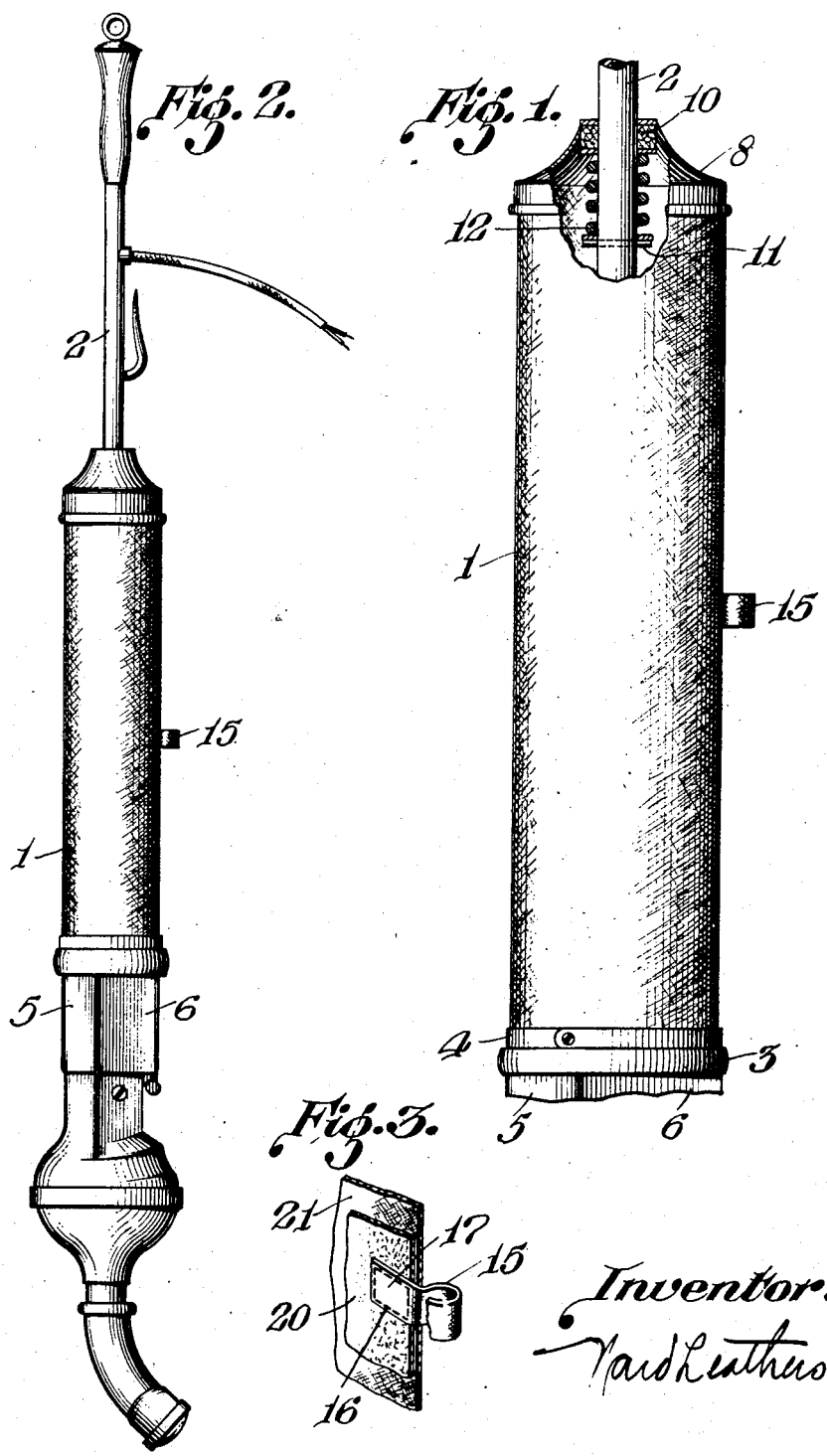
Inventor:
Ward Leathers Patented July 5, 1938

2,122,799

UNITED STATES PATENT OFFICE 2,122,799

SHAKER FOR VACUUM CLEANER FILTERS

Ward Leathers, Haworth, N. J., assignor to Quadrex Corporation, New York, N. Y., a corporation of Delaware Application February 24, 1936, Serial No. 65,392

1 Claim. (Cl. 183—58)

The general object of my invention is to produce an improved, light-weight suction-cleaning device for vacuum cleaner purposes. It refers to filter for same, and especially to those most applicable to the type of vacuum cleaner having a motor-suction-unit rigid with the handle thereof. It has to do particularly with the type of filter which surrounds the handle, both encased and uncovered, and provides a practical means of cleaning the filter before the dirt receptacle is removed for emptying.

Where filters are used in conjunction with removable dirt receptacles, and particularly where they are substantially concentric with the handle and motor axis of a vacuum cleaner, relatively small filter areas are available and it is highly desirable that means be provided whereby they may be manually shaken before the dirt receptacle is emptied. This is especially true in the type of filter which surrounds the handle as shown in my co-pending application No. 65,395 now Pat. No. 2,083,914, June 15, 1937, and 65,398 now Pat. No. 2,083,915, June 15, 1937, as well as in the type of machine which may present a somewhat similar external form but in which there is no handle inside the filter as shown in my co-pending application for Letters Patent No. 65,397 now Pat. No. 2,090,453, Aug. 17, 1937.

Where the filter fabric is exposed, it is desirable that the filter top be yieldable and, in this case, a shaking mechanism as herewith shown works in conjunction with said yieldable top.

In order to set forth my invention so that those familiar with these arts may understand, I have prepared this specification and appended drawing hereto of which:—

Figure 1 is a partially sectioned side view of an exposed filter with shaker.

Figure 2 is a side-view of a vacuum cleaner to which this invention is applied.

Figure 3 is a detail of the shaker tab.

A substantially cylindrical porous filter 1, Fig. 1, preferably of filtering fabric, surrounds a handle 2 passing through the filter of a vacuum cleaner (as fully shown in Figure 2). The filter is fastened peripherally as by a clamping ring 4 to a filter holder 3 rigidly joined to the handle 2. A dirt laden air inlet is shown at 5 and a dirt receptacle at 6. A solid but flexibly mounted cap 8 is suitably joined to the top of the filter 1. It is free to move a limited distance longitudinally on the handle 2 and provided with an air and dirt seal 10, such as a felt washer. A pin 11 through the handle 2 supports a spring 12 surrounding the handle which forces the cap 8 upward on the handle holding the filter 1 taut and cylindrical. On the side of the filter 1 is a projecting shaker tab or handle 15. This tab may be made of a loop of flexible material such as woven tape, as shown in Figure 3. Stitching 16 may make of this tape, a firm loop. The wings 17 may then be joined to the filter fabric as by sewing.

Where the filter 1 is made of double material, see Figure 3, as for example, with normally efficient filter material 20 on the inside and an exceptionally porous material 21 on the outside used for decorative or protective purposes, it is essential that the two pieces of fabric be firmly joined together adjacent to the attachment of the shaker 15, or that the shake tab 15 itself be passed through the outer material and joined to the inner material as by sewing the wings 17 thereto.

In operation it is found that it is highly desirable to press downward on the top cap 8 in order to obtain sufficient movement for snappy shaking with the shaker tab. This cooperative function accomplishes a very satisfactory cleansing of the interior of the filter—a most desirable operation immediately before emptying the dirt receptacle 6.

Having set forth my invention in a form reduced to mechanical practice it should be understood that there are many types of construction familiar to those versed in these arts which accomplish the same purpose without departing from the spirit of my invention.

I claim:

In a vacuum cleaner, a handle, a filtering sleeve substantially concentric with said handle, a cap for said filtering sleeve yieldably joined to said handle, a part projecting from the side of said sleeve and joined thereto, and with said yieldable cap and said projecting part operably related for shaking said filter for cleaning purposes.

WARD LEATHERS.